(No Model.) 3 Sheets—Sheet 1.

E. P. LYNCH.
COMBINED CORN AND COTTON PLANTER.

No. 376,534. Patented Jan. 17, 1888.

Attest:
Sidney P. Hollingsworth
F. T. Chapman

Inventor:
E. P. Lynch
By his Atty
Phil. T. Dodge

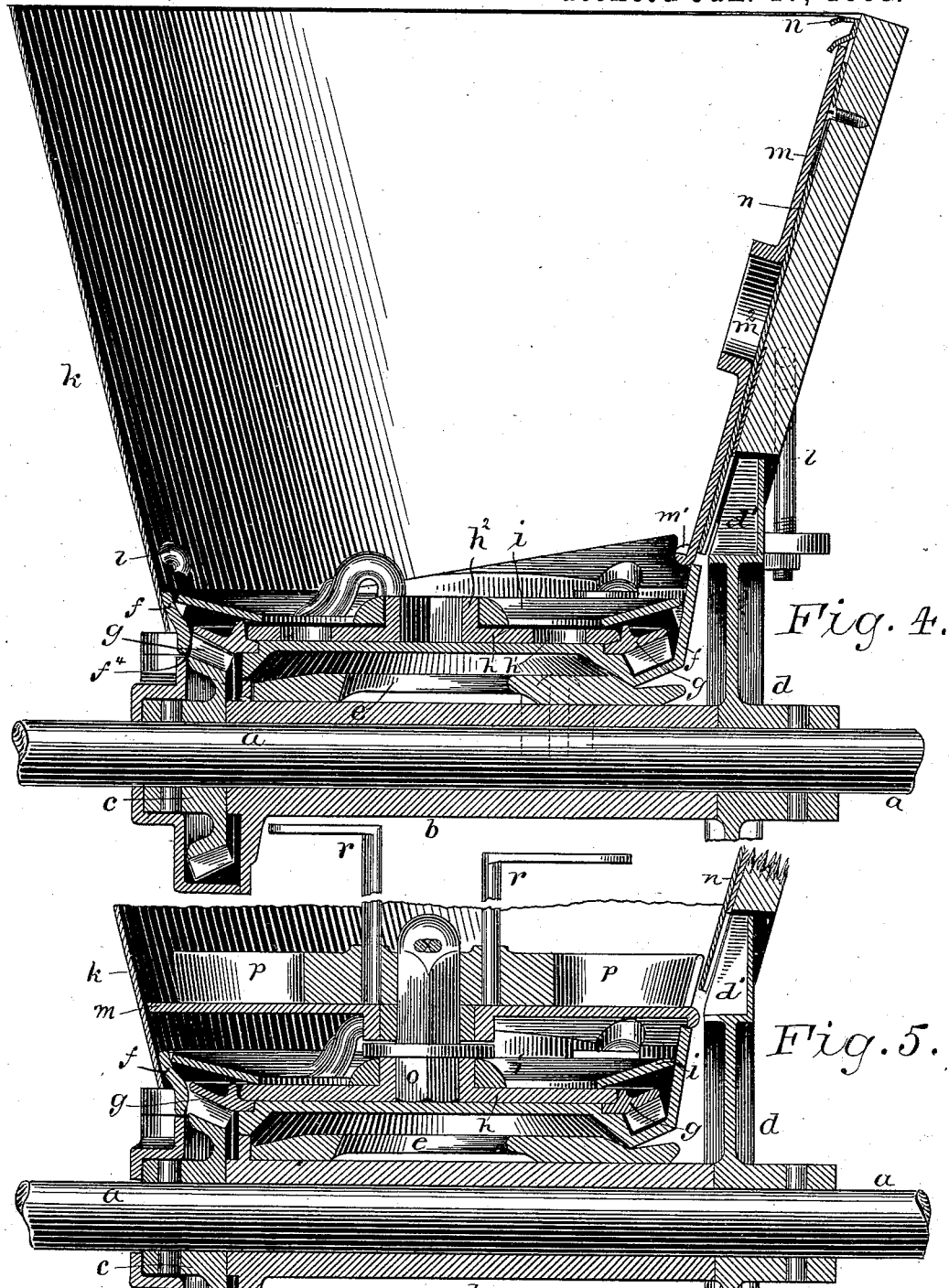

(No Model.) 3 Sheets—Sheet 3.
E. P. LYNCH.
COMBINED CORN AND COTTON PLANTER.
No. 376,534. Patented Jan. 17, 1888.
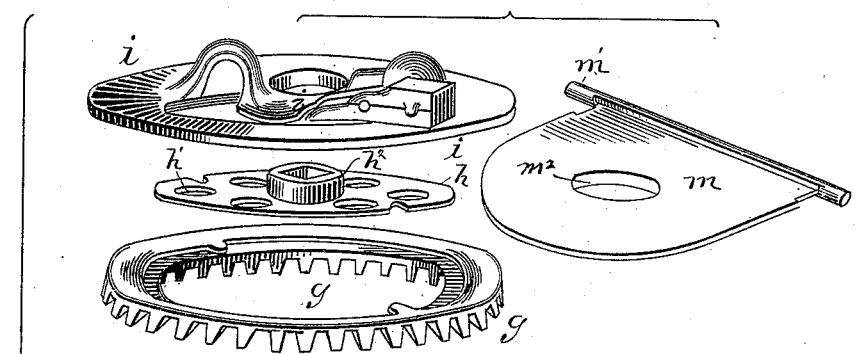
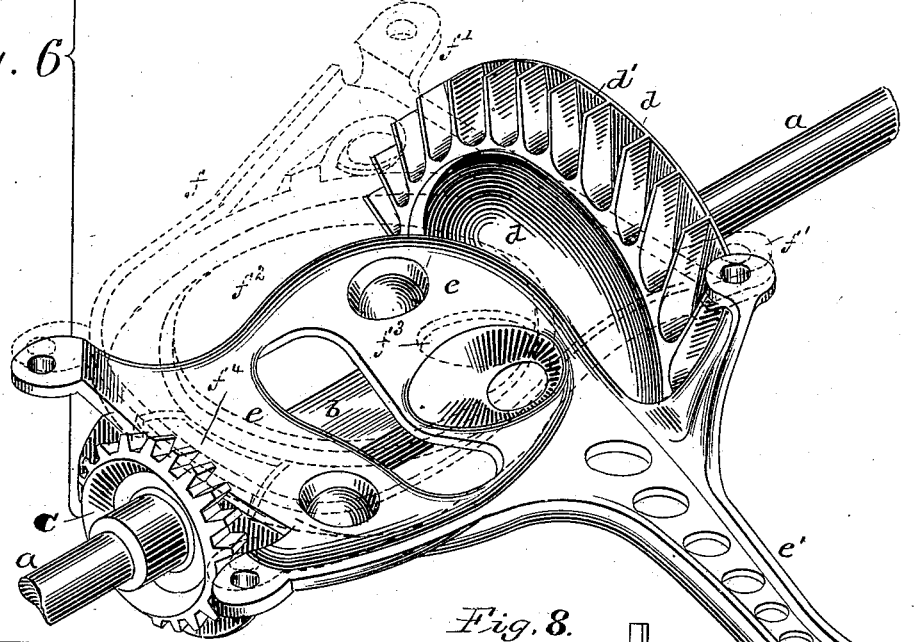
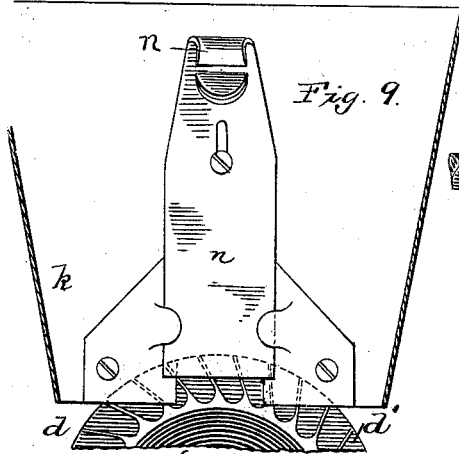
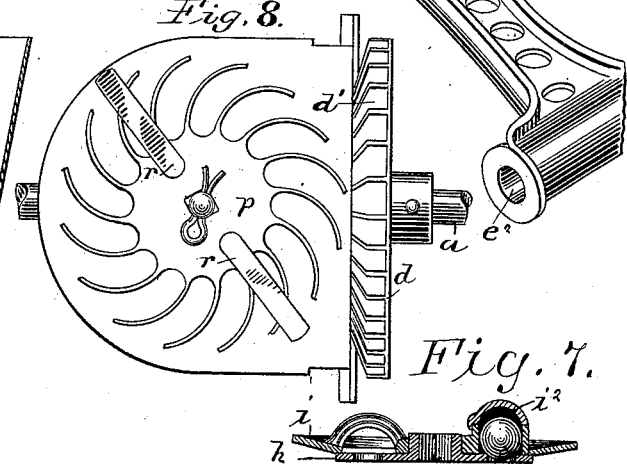
Witnesses: H. C. Newman, Ed. A. Newman
Inventor: E. P. Lynch
By his Attorney Phil. T. Dodge

UNITED STATES PATENT OFFICE.

EDWARD P. LYNCH, OF DAVENPORT, IOWA.

COMBINED CORN AND COTTON PLANTER.

SPECIFICATION forming part of Letters Patent No. 376,534, dated January 17, 1888.

Application filed October 14, 1887. Serial No. 252,366. (No model.)

*To all whom it may concern:*

Be it known that I, EDWARD P. LYNCH, of Davenport, in the county of Scott and State of Iowa, have invented certain Improvements in Combined Corn and Cotton Planters, of which the following is a specification.

The aim of my present invention is to provide a machine which may be speedily adjusted for the planting of corn or cotton seed, as occasion may require.

To this end the invention consists, mainly, in combining with a corn-dropping mechanism using a horizontal perforated disk of the ordinary type a cotton-dropping mechanism adapted to be driven thereby.

My dropping mechanism is applicable alike to walking and riding cultivators of the wheeled type, and also to the frame of the small walking-cultivators such as are now in common use.

Figure 1:
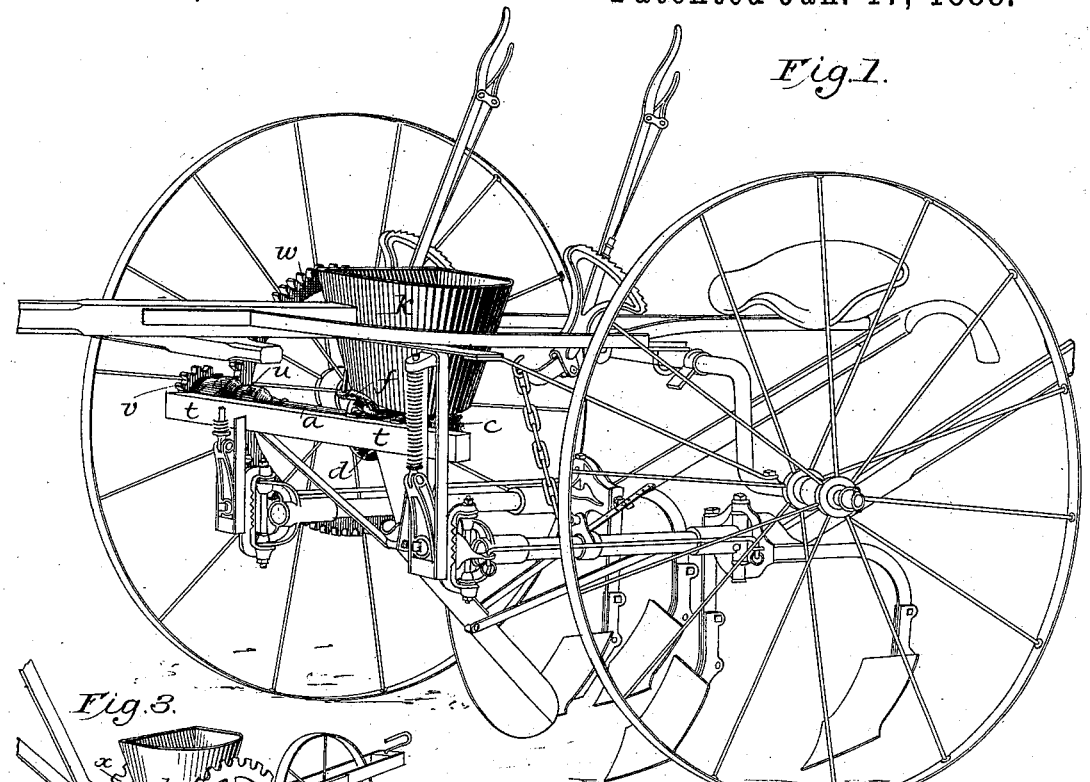
Figure 3:
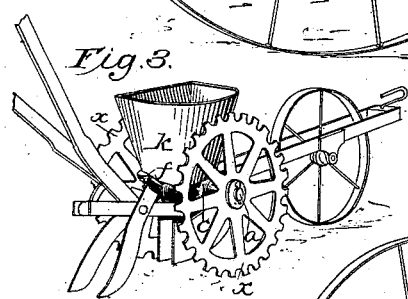
Figure 2:
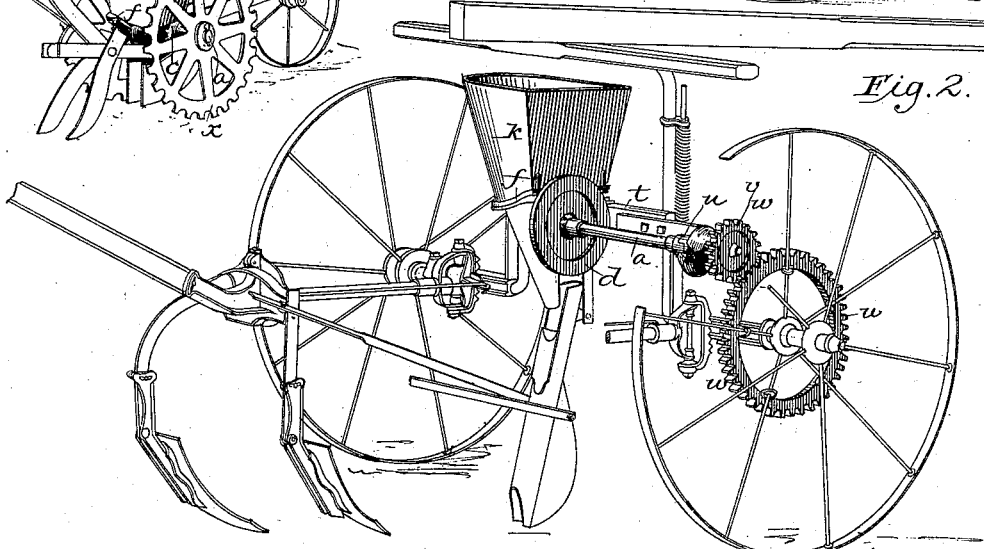

In the accompanying drawings, Figure 1 represents a riding-cultivator with my dropping mechanism applied thereto. Fig. 2 is a perspective view of a walking-cultivator provided with my improved dropping mechanism, one of the beams being broken away in order to expose other parts to view. Fig. 3 is a perspective view of a one-horse planter having the present invention embodied therein. Fig. 4 is a transverse vertical section through the center of the seeding mechanism as adjusted for the dropping of corn, beans, and similar seeds. Fig. 5 is a similar view of the same with the parts adjusted for the distribution of cotton-seed. Fig. 6 is a perspective view showing the principal parts of the seeding mechanism separated from each other, but arranged one above another in the order in which they are assembled. Fig. 7 is a cross-section through one edge of the dropper-plate, showing the spherical gravitating knocker to insure the delivery of the seed. Fig. 8 is a top plan view of the horizontal wheel for discharging cotton-seed, with a portion of the vertical wheel adjacent thereto. Fig. 9 is an inside face view of the hopper, showing the gate and delivery-throat through which the cotton-seed passes to the vertical wheel.

In order that the nature of the invention may be the more readily understood, I will first describe the details of the seeding mechanism, referring more particularly to Figs. 4 to 8, in which $a$ represents a horizontal driving-shaft mounted in a sleeve or bearing, $b$, and provided at one end of the sleeve with a beveled pinion, $c$, and at the opposite end with a vertical cotton-seed-delivering wheel, $d$, hereinafter described in detail.

The shaft-bearing $b$ is bolted rigidly to an overlying frame, $e$, which is preferably given the general form represented in Fig. 6, with a forwardly-extending arm, $e'$, having at the forward end a hole, $e^2$, to receive a pivot by which the seeding apparatus will be connected with the remainder of the machine. On top of the frame $e$ is seated a plate, $f$, having a series of ears, $f'$, through which it is bolted to corresponding ears on the frame $e$. The plate $f$ is formed, as shown in Figs. 4 and 6, with an annular groove or depression, $f^2$, a seed-delivery opening, $f^3$, and an opening, $f^4$, through which the upper edge of the pinion $c$ is exposed.

In the annular groove $f^2$ is mounted a ring, $g$, having on its under side gear-teeth, through which it receives motion from the pinion $c$. The inner edge of the ring $g$ is shouldered or rabbeted to receive a removable corn-dropping plate, $h$, the edge of which is notched to interlock with corresponding projections on the ring, so that when in place it is both supported and rotated by the latter. This dropper-plate is provided with a series of seed cells or openings, $h'$, by which the charges of corn are measured, carried to the opening $f^3$, and delivered therethrough in the same manner as in the dropping devices now in common use in corn-planting machines. The disk may be removed at will and replaced by another differing in the size or number of its cells, and thus the machine adapted for planting seeds of different kinds and in different quantities.

At its center the dropping-disk is formed with an upwardly-extending hub, $h^2$, having a central hole or socket of angular form. This hub projects upward into and the disk is confined in place by an overlying skeleton plate, $i$, adapted to bear at its edges on the upturned edges of the plate $f$. The plate $i$ is provided, as usual in this class of droppers, with a spring finger or cut-off, $i'$, bearing on the dropper-plate directly above and in advance of the seed-delivery opening. The plate $i$ is further provided in its under side, as shown in Fig.

7, with a pocket, $i^2$, containing a gravitating ball, $i^3$, which serves as a knocker to insure the discharge of the corn.

The parts above described are surrounded by and form the bottom of a seed box or hopper, $k$. On one side this hopper is formed of an upright board, the lower edge of which is recessed to encircle the upper edge of the vertical wheel $d$, which latter projects above the corn-delivering devices, as shown. The remaining portion of the hopper is formed of a sheet of metal extended at its lower edge closely around the outer upturned edge of the plate $f$. The hopper as a whole is secured in place by a series of bolts, $l$, having their upper ends engaged through the walls of the hopper and their lower ends passed through the underlying plates and secured by nuts.

Above the dropper-plate $h$ and the overlying plate $i$, I mount a plate, $m$, hinged at one edge, and so formed and arranged that it may be turned upward against the inside of the hopper to cover the upper edge of the wheel $d$, as in Fig. 4, in order to permit the operation of the corn-distributing devices, or turned downward to a horizontal position, so as to cover the corn-distributing devices and render them for the time being inoperative, at the same time exposing the upper edge of the wheel $d$, so that the seed may be passed from the interior of the hopper thereto.

I prefer to form the plate $m$, as shown in Fig. 6, with journals or trunnions $m'$, which are seated in corresponding notches in the plate $f$, and confined by the lower edge of the hopper resting thereon. It is to be understood, however, that this plate may be otherwise hinged, or that it may simply be made removable. For the purpose of holding the plate in its elevated position, and also of regulating the size of the opening through which the upper edge of wheel $d$ is exposed, I mount on the inner face of the hopper a vertically-sliding gate, $n$, the upper end of which is fashioned into a hook, so that it may engage over the plate $m$, as shown in Fig. 4, and the lower end of which is arranged to pass over the throat or opening through which the seed passes to wheel $d$, as plainly shown in Figs. 4 and 8.

The covering-plate $m$ is provided at the center with an opening, $m^2$, which registers, when the plate is down, with the socket in the dropper-plate $h$.

When the machine is to be used for feeding cotton, I provide a stud, $o$, with angular ends and a central collar, such as shown in Fig. 5, and after inserting one end in the socket of the dropper-plate $h$, I turn the plate $m$ downward, thereby securing it in place, after which I apply to the upper end of the stud, which projects through and above the plate $m$, a horizontal feed-wheel, $p$, having a series of arms extending outward from a central hub and adapted to force the cotton-seed outward through the side of the hopper and into the pockets of the vertical wheel $d$. I prefer to form the horizontal wheel with its arms curved eccentrically backward and outward, as shown in Fig. 8; but it is to be understood that these arms may be modified in form and that the wheel may be replaced by any other feeder which will operate in the same position to force the seed through the side of the hopper.

The wheel $d$ is formed at its periphery with a series of cells or pockets, $d'$, open at the periphery and at the inner face of the wheel. Being thus formed, the pockets receive the seed readily from the side and deliver it freely in the course of its revolution at the under side. I prefer to provide the wheel $p$ with one or more angular upright arms, $r$, which serve as agitators to loosen the mass of seed and insure its descent steadily to the feeding devices.

From the foregoing explanation it will be understood that when the wheel $p$ is removed and the plate $m$ turned to an upright position the parts operate for the distribution of corn in essentially the same manner as those now in common use, the corn from above entering the cells of the plate $h$ and being carried forward until they reach the discharge-opening thereunder. When, however, the plate $m$ is turned down and the wheel $p$ placed in position, the dropper-plate ceases its action as a dropper, but becomes a driver for the wheel $p$, by which the seed is conveyed uniformly to the delivery-wheel $d$.

It is to be noted that my invention is based upon the utilization of a complete corn-dropping mechanism to operate cotton-seed-dropping devices, which are applied removably thereto; or, in other words, it contemplates the temporary application of cotton seed-feeding devices to a corn-dropping mechanism in such manner as to be driven thereby. It does not contemplate a driving-gear to which two separate and distinct feeding mechanisms may be applied interchangeably.

The seeding apparatus as a whole may obviously be applied to a machine of any appropriate construction in other respects, and its shaft $a$ may receive motion through driving devices of any suitable character.

In Fig. 1 I have represented the devices as applied to an ordinary two-wheeled riding-cultivator in which an arched axle, mounted in ground-wheels at its ends, is provided with a tongue, draft devices, and two horizontally and vertically swinging shovel-carrying beams in the usual manner. In this case the seeder-frame is bolted rigidly to a bar, $t$, secured removably to the front of the machine. The shaft $a$ is provided with a clutch, $u$, receiving motion through a clutch-pinion, $v$, from a gear, $w$, secured to one of the ground-wheels.

In Fig. 2 I have represented an ordinary walking-cultivator in which the arched axle is provided, as usual, with ground-wheels, a tongue, and shovel-carrying beams. In this case the seeding devices are bolted to a bar, which is in turn bolted to the arched axle. Motion is communicated, as in the preceding example, through a clutch-pinion on the shaft *a* from the pinion *w*, secured to one of the ground-wheels.

In Fig. 3 I have shown the devices applied to a one-horse planter, the arm of the base-frame *e* being jointed to the seeder-frame in the same manner as in Letters Patent of the United States granted to me on the 24th day of August, 1886, No. 347,880. The ends of the axle *a* are in this case provided with two ground-wheels, *x*, through which motion is imparted directly thereto.

The machine, whatever its form, will be provided with suitable devices for opening the furrow and for conducting the seed thereto. As these contrivances are generally used in such machines in various forms and constitute no part of the present invention, it is deemed unnecessary to recite them in detail herein.

Having thus described my invention, what I claim is—

1. In a combined corn and cotton-seed planter, the horizontal corn-dropping plate and its driving mechanism, in combination with its hopper having a side opening, means for closing said opening, the removable cotton-planting wheel, and a connection between said wheel and the dropper-plate whereby the corn-dropping mechanism is rendered available for actuating the cotton-planting devices.

2. The rotary perforated corn-dropping plate and its sustaining and driving devices, of ordinary or suitable character, in combination with the hinged plate *m*, the hopper with a side delivery-opening, the removable cotton-planting wheel *p* and its central driving-stud, and the vertical wheel.

3. In a convertible seed-planting machine, a dropper-plate, in combination with a plate for covering the same and rendering it inactive as a dropper, a removable secondary dropper plate or wheel overlying the first, and a stud for communicating motion from one dropper-plate to the other.

4. In a convertible seeding-machine, the horizontal driving-shaft provided with the pinion *c* and wheel *d*, in combination with the gear-ring *g*, engaging said pinion and carrying the perforated dropper-plate *h*, the plate *m*, the radially-feeding plate or wheel *p*, the driving-stud, and the hopper adapted to deliver its contents to the plate *h* or wheel *d*, as demanded.

5. In a seed-distributing mechanism, the channeled plate *f*, with openings $f^3$ and $f^4$, in combination with the toothed ring *g*, the driving-pinion *c*, and the detachable perforated dropper-plate *h*, seated in and carried by the ring *g*, as described.

6. In a cotton-planter, the combination of a hopper, a horizontal wheel provided with arms to feed the seed horizontally and radially, and a vertical wheel, *d*, with cells or pockets arranged to receive the seed from the first-named wheel, as shown.

7. In combination with a hopper and a perforated horizontally-rotating dropper-plate at its bottom, a movable plate, *m*, by which the dropper-plate may be covered, and a side gate, *n*, affording an outlet from the hopper, whereby the parts may be adapted to discharge downward through the bottom plate or laterally from the hopper.

8. In combination with the dropper-plate *h*, the hopper with a side opening, the hinged plate *m*, and the sliding gate *n*, adapted, as described, to serve the double purpose of closing the side opening of the hopper and of retaining the plate *m* in an upright position.

9. In a seeding mechanism, the combination of a hopper with a lateral opening, a horizontally-revolving feed wheel or plate, *p*, located in the base of said hopper, and a vertically-revolving wheel, *d*, provided with cells or pockets, as described.

10. In a seed-dropping mechanism, the combination of a hopper, a horizontal wheel with arms or fingers to deliver the seed through the side of said hopper, and an external vertically-revolving wheel provided with peripheral cells or pockets to receive the seed as it issues from the side of the hopper.

11. In a seeding mechanism, the combination of a hopper with a seed-delivery opening, a horizontally-revolving wheel, *p*, with backwardly-curved arms located in the base of the hopper, and one or more agitator-arms, *r*, rising from said wheel, as described.

In testimony whereof I hereunto set my hand, this 9th day of September, 1887, in the presence of two attesting witnesses.

EDWARD P. LYNCH.

Witnesses:
   FRED. M. DECKER,
   INGLE BARKER.